United States Patent [19]

Suica

[11] Patent Number: 4,787,270
[45] Date of Patent: Nov. 29, 1988

[54] ROBOTIC MANIPULATOR
[75] Inventor: David E. Suica, Cincinnati, Ohio
[73] Assignee: Cincinnati Milacron Inc., Cincinnati, Ohio
[21] Appl. No.: 13,378
[22] Filed: Feb. 11, 1987
[51] Int. Cl.4 .............................................. F16H 37/06
[52] U.S. Cl. .............................. 74/665 M; 74/665 Q; 414/735; 901/25
[58] Field of Search ............ 74/665 L, 665 M, 665 Q; 414/4, 735; 901/25, 26, 36, 37, 38

[56] References Cited

U.S. PATENT DOCUMENTS

| | | | |
|---|---|---|---|
| 3,739,923 | 6/1973 | Totsuka ................. | 414/735 |
| 3,922,930 | 12/1975 | Fletcher et al. ........... | 414/738 X |
| 4,030,617 | 6/1977 | Richter ..................... | 414/4 |
| 4,068,536 | 1/1978 | Stackhouse .................. | 74/417 |
| 4,365,928 | 12/1982 | Baily ..................... | 414/735 |
| 4,402,234 | 9/1983 | Malarz et al. ................ | 414/4 X |
| 4,627,786 | 12/1986 | Minematsu et al. ......... | 414/735 |
| 4,637,774 | 1/1987 | Nakamura et al. .......... | 414/735 |
| 4,642,021 | 2/1987 | Kikuchi ...................... | 901/25 X |
| 4,662,815 | 5/1987 | Zimmer ..................... | 414/735 |
| 4,684,313 | 8/1987 | Minematsu et al. ......... | 414/735 |
| 4,690,012 | 9/1987 | Dahlquist ..................... | 74/479 |
| 4,696,202 | 9/1987 | Jinriki et al. ............... | 414/735 X |

FOREIGN PATENT DOCUMENTS

| | | | |
|---|---|---|---|
| 0130539 | 1/1985 | European Pat. Off. ............ | 901/26 |
| 0209111 | 1/1987 | European Pat. Off. ............ | 901/26 |
| 2551390 | 3/1985 | France . | |
| 2595288 | 9/1987 | France . | |
| 61-86159 | 5/1986 | Japan ................... | 901/26 |

OTHER PUBLICATIONS

Research Disclosure, No. 237, Jan., 1984, pp. 9, 10, No. 23710, Havant, Hampshire, GB, "Triaxial Robot Wrist".
Cincinnati Milacron–Timken–"Tapered Roller Bearings in Industrial Robots", Jun. 3, 1982.

Primary Examiner—Leslie A. Braun
Assistant Examiner—Dwight G. Diehl
Attorney, Agent, or Firm—Frost & Jacobs

[57] ABSTRACT

An improved robotic manipulator of the type having a plurality of serially-connected drive shafts and a mounting surface affixed to one end thereof. The manipulator includes a first shaft rotatable about a first axis coincident with one ordinate of a mutually perpendicualr triordinate system and a first housing rotatable about that first axis, a second shaft rotatably mounted to said first shaft for rotation about a second axis obliquely oriented with respect to said first axis, and a second housing rotatable on the first housing about a second axis. Rotational movement is imparted to the second shaft about the second axis in accordance with rotational movement of a shaft rotatable about the first axis. A mounting surface has a centerline angularly oriented with respect to the second shaft, and a third shaft upon which the mounting surface is attached is rotatable about a third axis angularly oriented with respect to the second axis. An axis bearing cylinder is substantially immovably mounted on the second housing parallel to the second axis, with such axis bearing cylinder extending partially inwardly into the first housing and providing support for a gear cluster arrangement substantially independent support for a gear cluster arrangement produces a stiffer drive train, helps control backlash, and simplifies assembly.

19 Claims, 4 Drawing Sheets

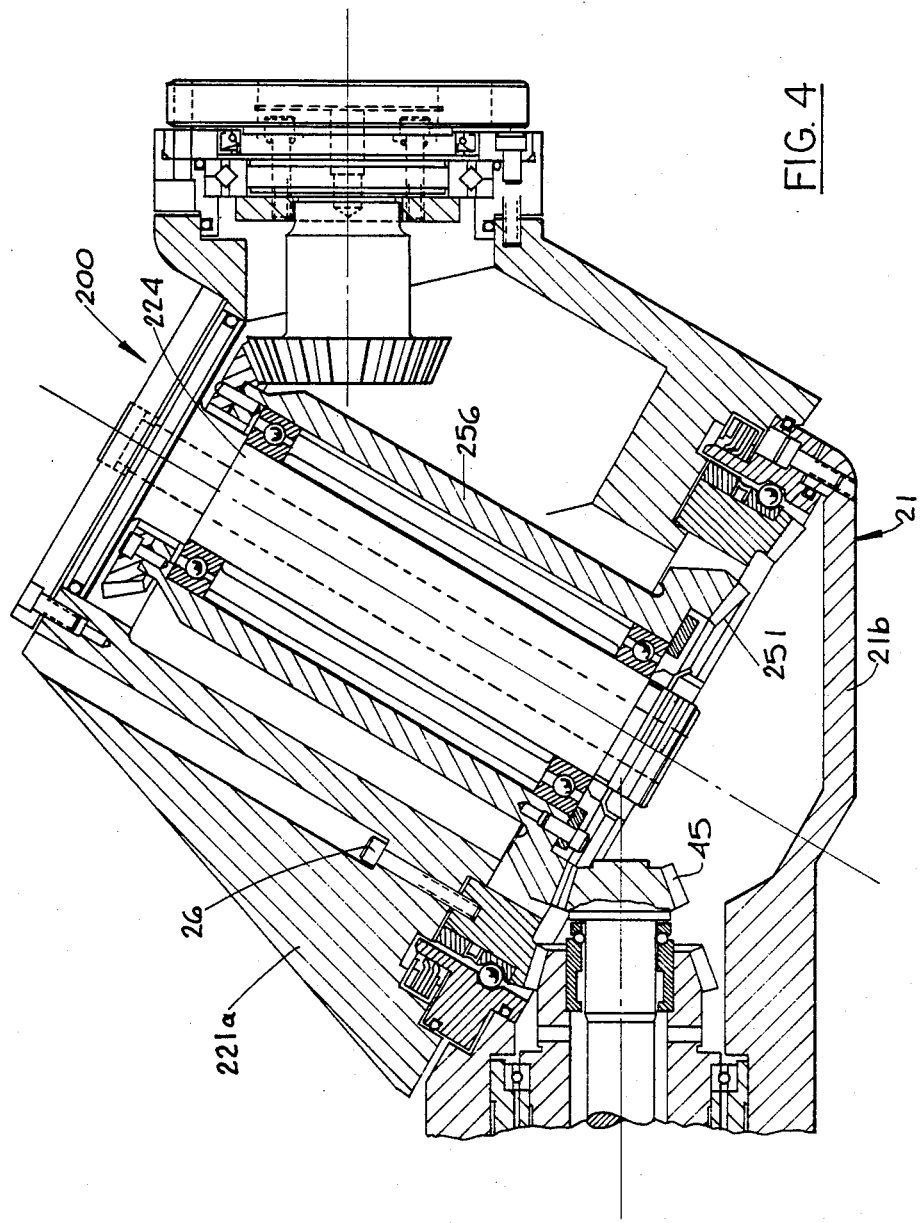

ized robotic manipulators were generally variations of three basic types of designs. One of these designs is the link and pivot design which utilizes a series of pivotally supported segments with an end-effector. An example of a link and pivot robot would be one in which a grasping device or a welding gun or the like is attached to the distal end of the link. A second type of prior art robot has extending links in combination with pivots, wherein the end points of the links translate along the axes of the links relative to one another. A third type of robot design is shown in U.S. Pat. Nos. 3,922,930 and 3,739,923.

ROBOTIC MANIPULATOR

TECHNICAL FIELD

This invention relates to a robotic manipulator including a remotely operable end-effector which can be moved in a manner such that its movement has a directional component in each of the directions defined by a mutually perpendicular triordinate system, and, more particularly, to an improved robotic manipulator of the described type having an end manipulator structure which is simpler to construct and which features less inherent gear backlash due to its unique structure.

BACKGROUND ART

The increasing use of automated manufacturing equipment in various industries has led to a need for more accurate robotic manipulators which can perform a broader range of tasks of more exacting nature. Until recently, prior art robotic manipulators were generally variations of three basic types of designs. One of these designs is the link and pivot design which utilizes a series of pivotally supported segments with an end-effector. An example of a link and pivot robot would be one in which a grasping device or a welding gun or the like is attached to the distal end of the link. A second type of prior art robot has extending links in combination with pivots, wherein the end points of the links translate along the axes of the links relative to one another. A third type of robot design is shown in U.S. Pat. Nos. 3,922,930 and 3,739,923.

In particular, this third type of robot features a plurality of serially-connected rotatable drive shafts to provide two or more axes of pivotable motion at a common point, with such movement being remotely operated. As mentioned above, modern applications for automated manufacturing equipment demand not only greater flexibility but greater accuracy as well. The flexibility and accuracy offered by a previously available industrial robot is dependent upon its programming and upon the physical orientational and positional capability of its moveable parts. Moreover, a robot's accuracy is dependent upon the positioning and orientation capabilities of the end-effector attached to the distal end of a moveable robotic arm.

U.S. Pat. No. 4,068,536, which issued to T. Stackhouse on Jan. 17, 1978, utilizes a robotic wrist section attached to the distal end of a robotic arm including a plurality of serially-connected rotatable drive shafts, as generally described by the above-referenced patents. The Stackhouse patent, however, discloses a unique structural design of its wrist section which increases both the orientational and positional capabilities thereof. The Stackhouse arrangement teaches the use of three serially-connected rotary shafts having axes which intersect at a single point to undergo continuous "rolls" while avoiding the mechanical interference inherent in prior art devices. The Stackhouse manipulator is capable of orienting a part normal to any point on a spherical sector generated by rotating the manipulator through space. This capability of orienting a part normal to any point on the generated spherical sector eliminates "holes" or "voids" in the spacial orientation of the end-effector, thereby increasing the manipulator's flexibility. However, as mentioned above, in addition to increased flexibility, modern day robotic manipulators increasingly must provide substantial accuracy in the movements of their end-effector. While the Stackhouse manipulator provides excellent flexibility, interaction of its gears and shafts permits the entrance of a limited amount of slack or backlash into the movements of the wrist. This slack or backlash is commonly inherent in situations where a plurality of gears interact to affect movement of a remote piece. Required clearances and other tolerances in the gear meshes create such inherent backlash, and this backlash can be quite detrimental to the overall "tightness" or accuracy of the resulting movement. Therefore, despite substantial advances in the flexibility of robotic manipulators, there remain problems of eliminating inherent slack in gearing systems which detract from the accuracy of the end-effectors of such manipulators.

DISCLOSURE OF THE INVENTION

It is an object of this invention to obviate the above-described problem.

It is another object of the present invention to provide an improved robotic manipulator which provides the capability of orienting a part normal to any point on the spherical sector generated by movement thereof, while simultaneously eliminating much of the inherent gear slack of backlash commonly encountered in such mechanisms.

In accordance with one aspect of the present invention, there is provided an improved robotic manipulator of the type having a plurality of serially-connected drive shafts and a mounting surface affixed to one end thereof. The manipulator includes a first shaft rotatable about a first axis coincident with one ordinate of a mutually perpendicular triordinate system, a second shaft rotatably mounted to said first shaft for rotation about a second axis obliquely oriented with respect to the first axis, means for imparting rotational movement to the second shaft about the second axis in accordance with rotational movement of a shaft rotatable about the first axis, a mounting surface having a centerline angularly oriented with respect to the second shaft, and a third shaft upon which the mounting surface is attached. The third shaft is rotatable about a third axis angularly oriented with respect to the second axis. The improvement of the subject invention comprises an axis bearing cylinder which is substantially immovably mounted parallel to the second axis, with such axis bearing cylinder providing support for a gear cluster arrangement for transferring rotational input to the third shaft.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 4 a partial cross-sectional view of a modified wrist section of the robotic manipulator shown in FIG. 1.

DETAILED DESCRIPTION OF THE INVENTION

Figure 1:
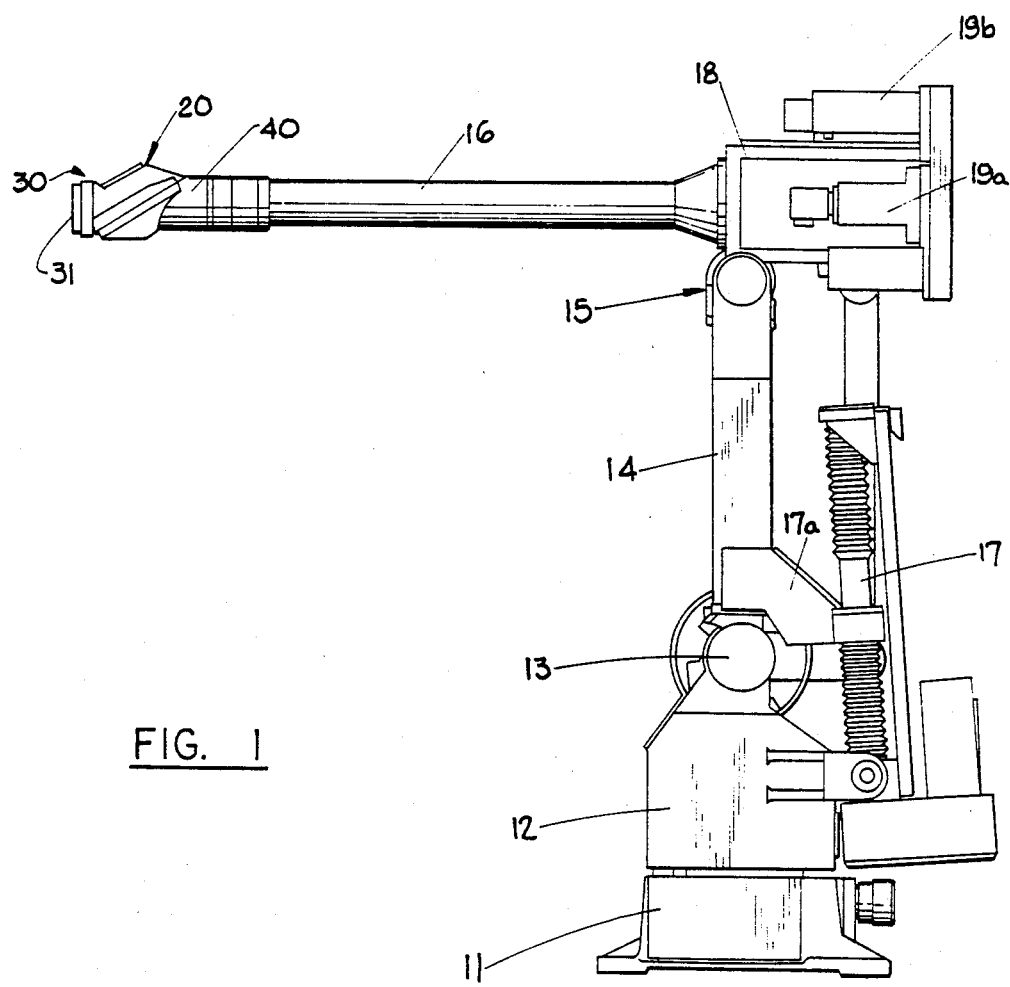
FIG. 1 is a perspective view of a robotic manipulator embodying the present invention.

Referring now to the drawings in detail, wherein like numerals indicate the same elements throughout the views, FIG. 1 illustrates a perspective view of a robotic manipulator 10 incorporating an embodiment of the present invention. Particularly, robotic manipulator 10 includes a base member 11 (normally secured to the floor in use), a rotatable turret portion 12, a shoulder 13 mounted upon turret portion 12, and an upwardly extending link arm 14 connecting shoulder 13 with the elbow joint 15. Pivotable elbow joint 15 connects the link arm 14 with manipulator arm 16 generally. Relative movement between link arm 14 and the extended arm 16 is controlled by a ball screw arrangement 17 having its lower end pivotally attached to turret 12 and its portion rigidly attached to shoulder 13 by the strut 17a. Relative movement between link arm 14 and manipulator arm 16 could similarly be controlled by a hydraulic or pneumatic cylinder, as desired. The extended arm section 16 is actually a set of four concentric shafts, with the inner three shafts being independently rotatable by individual rotational input sources 19a, 19b, and 19c (not seen in FIG. 1 because it is located on the far side of housing 18, see FIG. 2) which are supported on gear housing 18 as shown.

A wrist portion 20 adjoins the extended arm 16 at the distal end thereof. Wrist 20, in turn, supports an end-effector or grasping device 30 at its distal end (device 30 shown in the drawings as simply a cap for simplicity).

Figure 2:
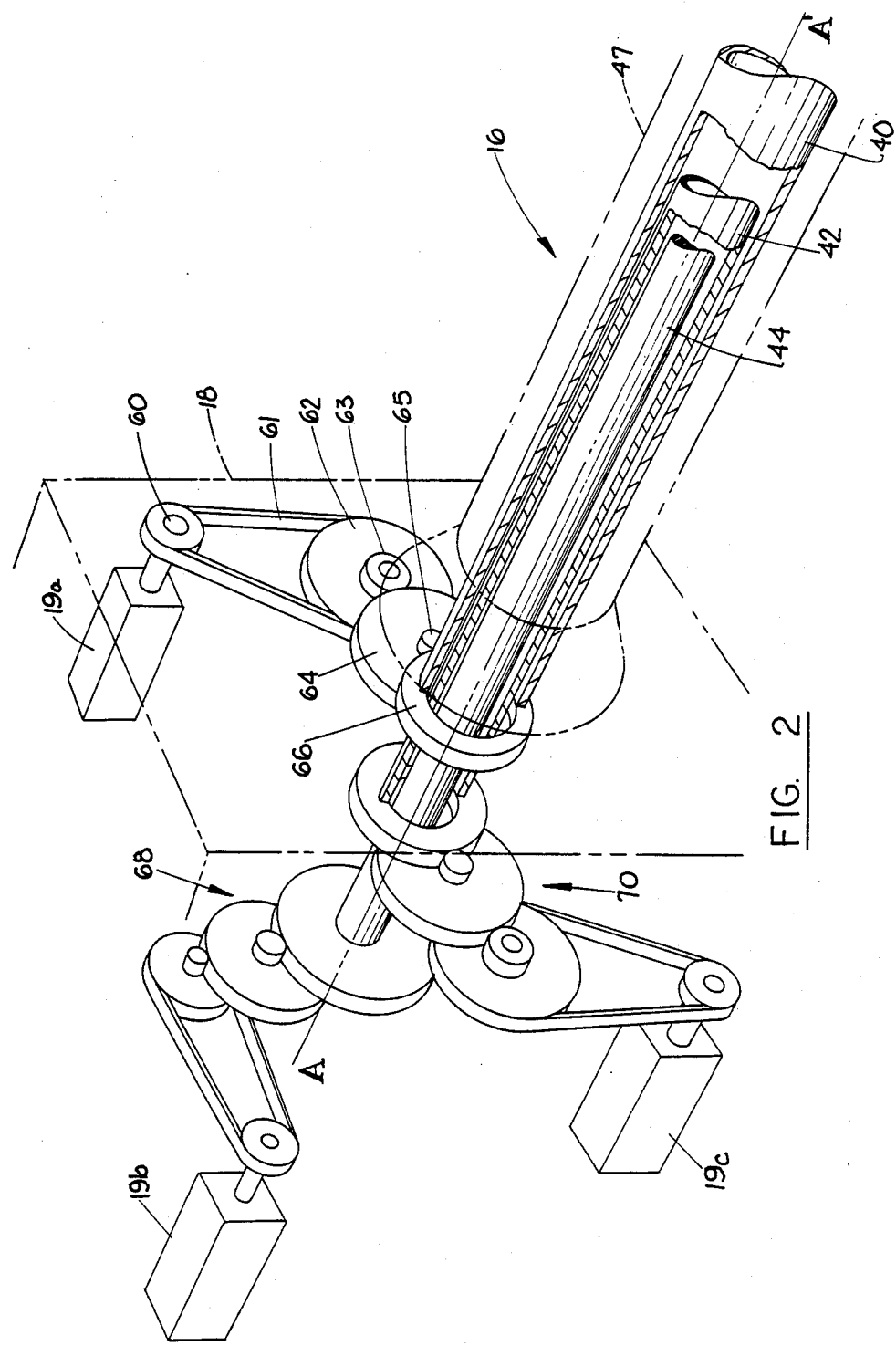
FIG. 2 is a diagrammatic illustration of the rotational input motors and forearm section of the robotic manipulator of FIG. 1, depicting a drive mechanism which can be employed in a robotic manipulator incorporating the present invention.

Referring now to FIG. 2, there is depicted a drive mechanism employed to rotate the concentric drive shafts of the extended arm 16 about a common axis A—A'. More particularly, rotational input motors 19a, 19b, and 19c are shown as being spaced about the outer periphery of gear housing 18. Motor 19a has an output shaft 60 connected by a chain or belt 61 to gear or pulley 62. Gear 62 is shown as including a smaller, integrally attached gear 63 which meshes with the larger gear 64 to transfer rotational input from motor 19a. Gear 64 similarly is shown as including a smaller, integrally attached gear 65 which meshes with spur gear 66 to transfer the rotational input directly to outer shaft 40. The series of transfer gears 62 through 66 is shown only as an example of a preferred manner of transferring rotational input from the input source or motor 19a to outer shaft 40. A series of gears is preferred as the size and number of gears utilized in such a transfer system can be uniquely designed to match the rotational movement from the input source or motor 19a to the desired rotational movement of outer shaft 40. A similar means of transferring rotational input is shown in FIG. 4 of the referenced U.S. Pat. No. 4,068,536, the disclosure of such patent being hereby incorporated herein by reference.

As illustrated in Figure 2, it is contemplated that rotational input from motors 19c and 19b will be transferred to intermediate shaft 42 and inner shaft 44, respectively, via corresponding transfer gear arrangements 68 and 70, respectively. As indicated above, the exact manner of transferring rotational input from the input sources to the respective concentric torque tubes is not critical to the present invention.

Figure 3:
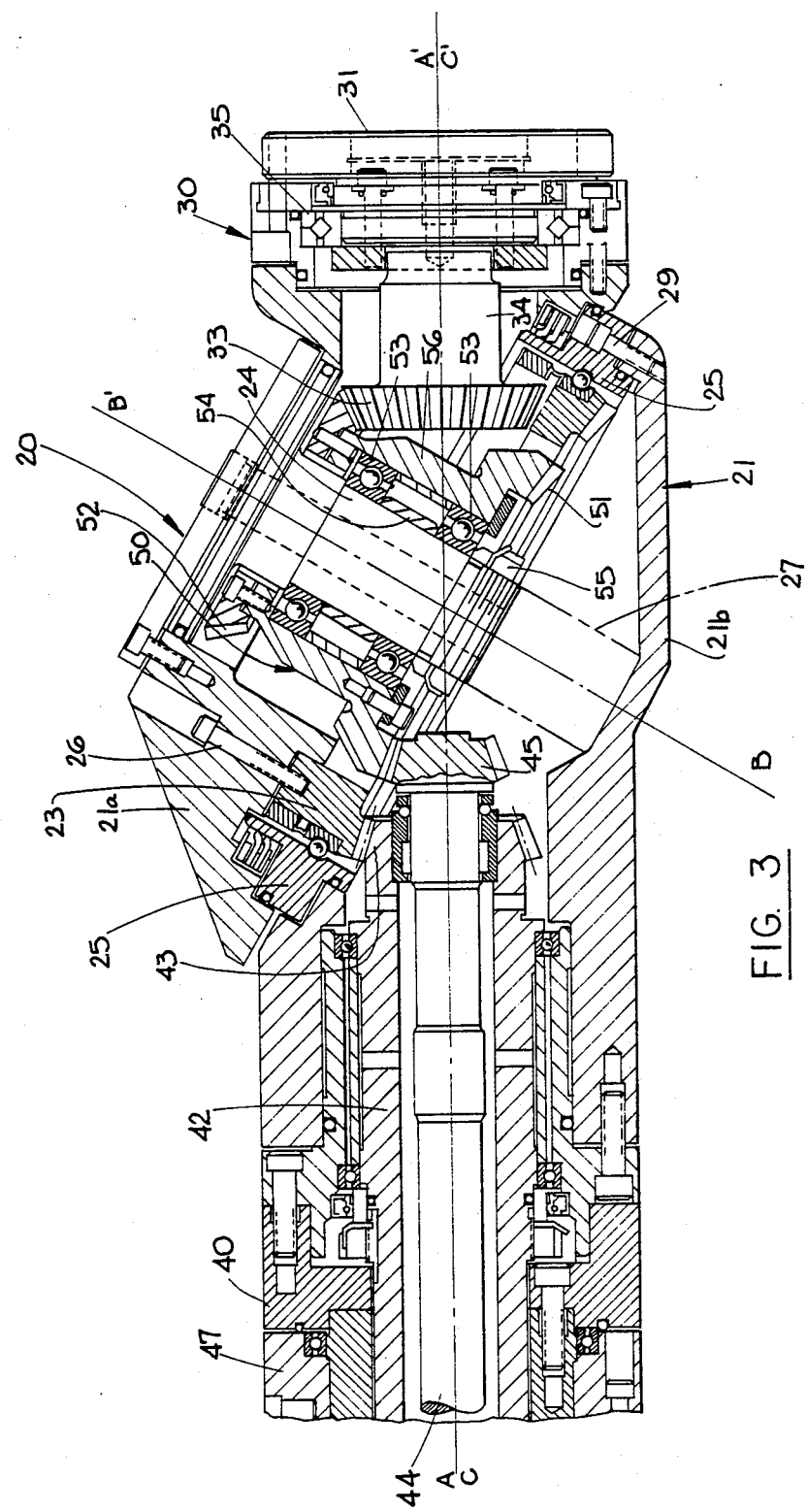
FIG. 3 is a partial cross-sectional view of the wrist section of the robotic manipulator of FIG. 1, taken along line 3—3 thereof.

As shown in FIGS. 2 and 3, shafts 44, 42, and 40 are concentrically arranged for rotational movement relative one another and relative to the outer shaft or protective housing 47. As shown in the above-referenced U.S. Pat. No. 4,068,536, such protective shaft housing need not extend over the full length of the concentric torque tube shafts, however, it is preferred that such a protective housing cover a substantial portion of extended arm 16 for safety considerations, and to maintain the concentric torque tube shafts relatively free of moisture and grime.

Referring now to FIG. 3, the wrist portion 20 of manipulator 10 is shown in cross-section and in greater detail. Wrist 20 has a split outer housing 21, having a rotatable hemispherical housing 21a and a substantially stationary hemispherical housing 21b mounted upon the distal end of extended arm 16. As illustrated in FIG. 3, it is preferred that protective shaft housing 47 extend a substantial portion of the distance from gear housing 18 to the distal end of extended arm 16, stopping short of the area of attachment of the hemispherical housings 21a and 21b to outer shaft 40. It is also preferred that stationary housing 21b be integrally connected to the distal end of outer shaft 40. Housing 21a is rotatably mounted with respect to both outer shaft 40 and its complimentary stationary housing 21b about a rotation axis B—B'. Both rotatable housing 21a and stationary housing 21b are, therefore, attached to outer shaft 40 and movable therewith as all three members rotate about the longitudinal axis A—A'. The attachment of outer shaft 40 and stationary housing 21b is rigid. Such attachment can be accomplished by any convenient means, such as by bolting, welding, or the like.

An intermediate torque transfer tube or shaft 42 is rotatably mounted inside of outer shaft 40 and it includes a bevel gear 43 integrally attached at its distal end. Bevel gear 43 meshes with the corresponding bevel gear 23 which is rigidly attached to rotatable hemispherical housing 21a. Bevel gear 23 is attached to the lower outer portions of rotatable housing 21a, and is rotatably mounted about the periphery of stationary hemispherical housing 21b to ride on bearing 25. It is contemplated that bearing 25 would be press fitted into a race formed in the upper peripheral portions of stationary housing 21b, with the inner race of bearing 25 being press fitted about the outer periphery of bevel gear 23. In this way, the gear mesh between bevel gear 23 and bevel gear 43 can be preset when gear 23 is mounted within stationary housing 21b, with the rotatable housing 21a thereafter being attached to bevel gear 23. Rotatable hemispherical housing 21a can be attached to bevel gear 23 by any appropriate means, such as by a plurality of bolts, as shown at 26 on FIG. 3. Bearing 25 may also be bolted into stationary housing 21b, as illustrated by the bolt 29 of FIG. 3.

Rotational movement of the rotatable hemispherical housing 21a about axis B—B' is, therefore, imparted by intermediate shaft 42 through interaction of bevel gears 43 and 23, respectively. Shaft 42 is concentrically disposed within outer shaft 40 and is rotatable about longitudinal axis A—A'. As discussed in greater detail in the referenced U.S. Pat. No. 4,068,536, axis B—B' is oriented obliquely to longitudinal axis A—A'.

An innermost shaft 44 is located concentrically within shaft 42 along axis A—A'. Rotation of shaft 44 about axis A—A' drives bevel gear 45 mounted upon shaft 44, with bevel gear 45 meshing with the corresponding lower bevel gear 51 of gear cluster 50. In particular, gear cluster 50 comprises lower bevel gear 51, and an upper bevel gear 52 integrally attached to gear 51 by cluster shaft 56. Gear cluster 50 is rotatably mounted over the centrally disposed axis bearing cylinder or shaft 24. Particularly, axis bearing cylinder 24 depends from the upper portions of rotatable housing 21a, preferably having its longitudinal central axis substantially coincident with axis B—B'. Axis bearing cylinder 24 extends inwardly into the central portion of spherical housing 21 to provide support for gear cluster 50 therewithin. As illustrated, gear cluster 50 can conveniently rotatably mounted on axis bearing cylinder by a pair of spaced bearings 53. Bearings 53 are shown as being spaced apart by spacer 54, and gear cluster 50 is positively held on bearing cylinder 24 by the cluster retainer 55, which is preferably threadably attached to the lower distal end of bearing cylinder 24. While gear cluster 50 is shown as having its upper bevel ear 52 attached to cluster shaft 56 by a plurality of bolts 57, it is contemplated that any manner of integrally attaching lower bevel gear 51 to upper bevel gear 52 could equally be employed. In particular, it is desired that gear cluster 50 act as an integral pair of spaced bevel gears.

The provision of axis bearing cylinder 24, which is to be substantially immovably mounted parallel to (and preferably concentric with) second axis B—B' provides several distinct advantages over the prior art. In particular, cantilever mounting the axis bearing cylinder 24 from rotatable hemispherical housing 21a enables the assembly of gear cluster 50 and axis bearing cylinder 24 within rotatable housing 21a independent of stationary housing 21b. For this reason, rotatable housing 21a can be assembled apart from stationary housing 21b, with only final assembly of the two pieces and setting of the gear mesh between bevel gears 45 and 51 being necessary thereafter. Secondly, by providing a substantially immovable axis bearing cylinder 24, which need not extend completely across the inner portions of spherical housing 21, spacing requirements within housing 21 can be minimized. This allows the overall dimensions of housing 21 to be reduced. More importantly, however, this arrangement also enables the enlargement of the diameter of lower bevel 51 without increasing the required diameter of bearing cylinder 24 and the overall space requirements within spherical housing 21. By locating bevel gear 51 above bevel gear 45, the location of bevel gear 51 is nearer the central or largest portion of housing 21, where its diameter can be enlarged without requiring dimensional enlargement of the housing overall. The larger diameter of lower bevel gear 51 increases the effective diameter of cluster shaft 56, not only adding strength thereto, but also increasing the effective stiffness of gear cluster 50 and thereby reducing potential slack or backlash in the system. As discussed above, elimination of backlash in a robotic manipulator increases the overall accuracy of the end-effector and the robotic manipulator.

As illustrated in FIG. 3, axis bearing cylinder 24 need only extend into spherical housing 21 far enough to provide a required support for gear cluster 50. There may, however, be applications in which it would be desirable to provide an access shaft or hollow access opening through the center of spherical housing 21 through which power lines and/or material supply lines could be routed for use in conjunction with the tool or other end-effector to be attached at the distal end of extended arm 16. In this regard, phantom lines 27 are shown in FIG. 3 to illustrate the potential extension of axis bearing cylinder 24 to extend the distal end thereof to reach the outer portions of stationary housing 21b. It is contemplated that axis bearing cylinder 24 would be substantially hollow and could provide an unincumbered pathway through wrist 20, whereby such power lines and/or material supply lines could be fed to end-effector 30. Because axis bearing cylinder 24 is to be rigidly attached to rotatable housing 21a, it would effectively provide a protective sleeve for such lines to be fed through housing 21. This is true because bearing cylinder 24 simply provides support for cluster shaft 56, and does not itself move or transfer torque.

Rotational input provided through innermost shaft 44 to gear cluster 50 is transferred to bevel gear 33 of end-effector 30. Bevel gear 33 is attached to shaft 34 which is integrally attached to mounting surface 31. Mounting surface 31 is rotataby mounted within an end-effector 30 for rotation about axis C—C'. Mounting surface 31 is supported within end-effector 30 by a suitable bearing 35. Since end-effector 30 is integrally attached to rotatable housing 21a, it follows that shaft 34 and its axis of rotation C—C' also rotate about axis B—B' when rotatable housing 21a is rotated about axis B—B'. Therefore, it is apparent that each individual shaft 40, 42 and 44 moves end-effector 30 about a different axis of rotation. The relative movement of these parts is set forth in greater detail in the referenced U.S. Pat. No. 4,068,536. It should also be noted that due to this unique gear arrangement, clockwise rotation of shaft 44 will cause counterclockwise rotation of end-effector 30. Therefore, when shaft 40 is rotated clockwise, shaft 44 will be rotated counterclockwise, where the relative position of end-effector 30 is to remain the same on wrist 20. This opposite movement of shafts 40 and 44, respectively, prevents a situation where backlash in the two shafts would be additive if the two were moving in the same direction. In fact, the movement in opposite directions of shafts 40 and 44 makes backlash in the system subtractive. Although this phenomenon is relatively subtle, in applications where substantial movement accuracy is required, the resulting minimization of backlash is quite effective.

As mentioned above, an advantageous result of the unique structure of the present invention is the ability to assemble rotatable housing 21a with its attached gear cluster 50 and end-effector 30 independently and apart from stationary housing 21b. In this way, the rotatable mounting surface 31 and gear cluster 50 can be completely installed, and the gear mesh between bevel gears 33 and 52 can be preset. Similarly, stationary housing 21b can also be preassembled with the gear mesh between bevel gear 43 and bevel gear 23 being preset. As a result, final assembly requires only the attachment of rotatable housing 21a to stationary housing 21b, and the setting of the gear mesh between bevel gears 51 and 45, respectively. These convenient assembly procedures further facilitate routine maintenance and the like during the life of the equipment. By maximizing the effective diameters of bevel gears 23 and 51, the strength and effective stiffness of these gears is increased, and the inherent slack or backlash commonly encountered in gear meshes is minimized. Incorporation of gear cluster 50 additionally eliminates the need to connect a pair of spaced bevel gears to a common shaft by use of splines, keyways or the like. Elimination of such connection points simultaneously eliminates additional sources of backlash in the gearing system.

Moreover, the unique support system supplied by the axis bearing cylinder arrangement of the present invention provides a wrist mechanism which can easily be modified to provide an offset arrangement. In this regard, to modify the wrist 20 shown in FIG. 3 to accommodate offset applications, one would need only to replace the rotatable housing 21a shown with a similar housing having a lengthened configuration wherein axis bearing cylinder 24 and cluster shaft 56 were extended to provide the desired offset. In particular, FIG. 4 illustrates a modified wrist 200 having a lengthened or extended axis bearing cylinder 224, and a similarly extended cluster shaft 256. As can be seen, all other aspects of the robotic manipulator would remain unchanged, and the modification could be achieved simply by removing the bolts 26 of rotatable housing 21a, removing rotatable housing 21a, and substituting a modified rotatable housing 221a, as shown in FIG. 4. As described above, because housing 221a could be assembled independently of the stationary housing 21b, assembly would require only the setting of the gear mesh between bevel gears 251 and 45, respectively, and tightening of connector bolts 26. Offsetting the robotic manipulator in this manner can provide access to hard-to-get-to locations such as the undercarriage of an automobile on an automatic assembly line.

Other modifications of the described invention will be apparent to those skilled in the art. While several variations of the present invention have been mentioned and discussed herein, further adaptions could equally be made by those skilled in the art without departing from the scope of the present invention. Accordingly, this invention should be considered in terms of the following claims, and should be understood not to be limited to the details of structure and operation described and shown in the specification and drawings.

I claim:

1. An improved robotic manipulator of the type having a plurality of serially connected drive shafts and a mounting surface affixed to one end thereof, said manipulator including a first shaft rotatable about a first axis coincident with one ordinant of a mutually perpendicular triordinant system and a first housing rotatable about said first axis, a second shaft rotatably mounted to said first shaft for rotation about a second axis obliquely oriented with respect to said first axis and a second housing rotatable on said first housing about said second axis, means for imparting rotational movement to said second shaft about the second axis in accordance to rotational movement of a shaft rotatable about said first axis, the mounting surface having a centerline angularly oriented with respect to said second shaft, and a third shaft upon which said mounting surface is attached, said third shaft being rotatable about a third axis angularly oriented with respect to said second axis, wherein the improvement comprises:

an axis bearing cylinder substantially immovably mounted parallel to said second axis, said axis bearing cylinder having a first end mounted on said second housing and a second end extending partially inwardly into said first housing and said bearing cylinder being cantilever mounted to provide sole support, independent of said first housing means, for a gear cluster arrangement for transferring rotational input to said third shaft.

2. The robotic manipulator of claim 1, wherein said first and second housings are generally hemispherical in conformation, and wherein said axis bearing cylinder is substantially immovably connected to said rotatable hemispherical housing concentrically with said second axis, said axis bearing cylinder extending only partially into the resulting enclosed sphere formed by said first and second hemispherical housings for support of said gear cluster arrangement therewithin.

3. The robotic manipulator of claim 2, wherein said mounting surface is attached to said rotatable hemispherical housing, and wherein rotational input is provided to said third shaft by said gear cluster, said gear cluster being rotatably mounted on said axis bearing cylinder for rotational interaction with said third shaft.

4. The robotic manipulator of claim 3, wherein said third shaft and said gear cluster arrangement can be preassembled within the rotatable hemispherical housing, with the interacting gear meshes between such parts being preset independent of said stationary housing.

5. The robotic manipulator of claim 1, wherein said mounting surface is attached to said rotatable hemispherical housing, and wherein rotational input is provided to said third shaft by said gear cluster, said gear cluster being rotatably mounted on said axis bearing cylinder for rotational interaction with said third shaft.

6. The robotic manipulator of claim 5, wherein said third shaft and said gear cluster arrangement can be preassembled within the rotatable hemispherical housing, with the interacting gear meshes between such parts being preset independent of said stationary housing.

7. The robotic manipulator of claim 1, wherein said axis bearing cylinder depends interiorly from said rotatable housing, the length of said axis bearing cylinder being sufficient to extend substantially completely across the interior of the resulting interior space formed by said stationary and rotatable housings.

8. The robotic manipulator of claim 7, wherein said axis bearing cylinder is substantially hollow, thereby forming an effective conduit through said resulting interior space formed by the first and second housings, said conduit being available to route various power and supply lines through said sphere to said mounting surface.

9. An improved robotic manipulator of the type having a plurality of serially connected drive shafts and a mounting surface affixed to one end thereof, said manipulator including a first shaft rotatable about a first axis coincident with one ordinant of a mutually perpendicular triordinant system, a second shaft rotatably mounted to said first shaft for rotation about a second axis obliquely oriented with respect to said first axis, means for imparting rotational movement to said second shaft about the second axis in accordance to rotational movement of a shaft rotatable about said first axis, a mounting surface having a centerline angularly oriented with respect to said second shaft, and a third shaft upon which said mounting surface is attached, said third shaft being rotatable about a third axis angularly oriented with respect to said second axis, wherein the improvement comprises:

(a) a stationary housing located adjacent said end of said serially connected drive shafts;

(b) a rotatable housing corresponding to said stationary housing and being rotatably affixed thereto, said rotatable housing being rotatable relative said stationary housing about said second axis, said third shaft being rotatably mounted on said rotatable housing; and (c) an axis bearing cylinder substantially immovably cantilever mounted parallel to said second axis, on said rotatable housing, said axis bearing cylinder extending partially inwardly into said stationary housing and said bearing cylinder being cantilever mounted to provide sole support, independent of said stationary housing, for a gear cluster arrangement transferring rotational input to said third shaft.

10. The robotic manipulator of claim 9, wherein said mounting surface is attached to said rotatable housing, and wherein rotational input is provided to said third shaft by said gear cluster arrangement, said gear cluster being rotatably mounted on said axis bearing cylinder for rotational interaction with said third shaft.

11. The robotic manipulator of claim 10, wherein said axis bearing cylinder depends interiorly from said rotatable housing, the length of said axis bearing cylinder being sufficient to extend substantially complete across the interior of the resulting interior space formed by said stationary and rotatable housings.

12. The robotic manipulator of claim 11, wherein said axis bearing cylinder is substantially hollow, thereby forming an effective conduit through said resulting interior space formed by the housings, said conduit being available to route various power and supply lines through said sphere to said mounting surface.

13. The robotic manipulator of claim 10, wherein said third shaft and said gear cluster arrangement can be preassembled within the rotatable housing, with the interacting gear meshes between such parts being preset independent of said stationary housing.

14. The robotic manipulator of claim 9, wherein said third shaft and said gear cluster arrangement can be preassembled within the rotatable housing, with the interacting gear meshes between such parts being preset independent of said stationary housing.

15. An improved robotic manipulator of the type having a plurality of serially connected drive shafts and a mounting surface affixed to the distal end thereof, said manipulator including a first shaft rotatable about a first axis coincident with one ordinant of a mutually perpendicular triordinant system, a second shaft rotatably mounted to said first shaft for rotation about a second axis obliquely oriented with respect to said first axis, means for imparting rotational movement to said second shaft about the second axis in accordance to rotational movement of a shaft rotatable about said first axis, a mounting surface having a centerline angularly oriented with respect to said second shaft, and a third shaft upon which said mounting surface is attached, said third shaft being rotatable about a third axis angularly oriented with respect to said second axis, wherein the improvement comprises:

(a) a substantially spherical wrist joint located adjacent the distal end of said drive shafts, said wrist joint further comprising a stationary, substantially hemispherical housing and a rotatable, substantially hemispherical housing which is to be rotatably affixed to said stationary housing;

(b) said mounting surface being affixed to said rotatable housing and said third shaft being rotatably mounted on said rotatable housing; and (c) an axis bearing cylinder substantially immovably cantilever mounted, concentric with said second axis, on said rotatable housing, said axis bearing cylinder extending partially inwardly into said stationary housing and said bearing cylinder being cantilever mounted to provide sole support, independent of said stationary housing for a gear cluster arrangement transferring rotational input to said third shaft.

16. The robotic manipulator of claim 15, wherein said axis bearing cylinder depends interiorly from said rotatable hemispherical housing, the length of said axis bearing cylinder being sufficient to extend substantially across the interior of the resulting sphere formed by said stationary and rotatable hemispherical housings.

17. The robotic manipulator of claim 16, wherein said axis bearing is substantially hollow, thereby forming an effective conduit through said resulting sphere formed by the hemispherical housings, said conduit available to route various power and supply lines through said sphere to said mounting surface.

18. The robotic manipulator of claim 16, wherein said third shaft and said gear cluster arrangement can be preassembled within the rotatable hemispherical housing, with the interacting gear meshes between such parts being preset independent of said stationary housing.

19. The robotic manipulator of claim 15, wherein said third shaft and said gear cluster arrangement can be preassembled within the rotatable hemispherical housing, with the interacting gear meshes between such parts being preset independent of said stationary housing.

* * * * *